United States Patent [19]

Pardee

[11] Patent Number: 5,033,595
[45] Date of Patent: Jul. 23, 1991

[54] CLUTCH/BRAKE UNIT

[75] Inventor: James A. Pardee, Janesville, Wis.

[73] Assignee: Dana Corporation, Toledo, Ohio

[21] Appl. No.: 535,428

[22] Filed: Jun. 8, 1990

[51] Int. Cl.⁵ .................. F16D 67/02; A01D 69/08
[52] U.S. Cl. ..................... 192/18 R; 192/89 A; 56/11.3
[58] Field of Search ............... 192/12 R, 14, 15, 16, 192/18 R, 89 A, 93 A; 56/11.3, 11.8

[56] References Cited

U.S. PATENT DOCUMENTS

| | | | |
|---|---|---|---|
| 4,205,509 | 6/1980 | Miyazawa et al. | 56/11.3 |
| 4,226,313 | 10/1980 | Meldahl et al. | 192/18 R |
| 4,286,701 | 9/1981 | MacDonald | 192/18 R |
| 4,313,293 | 2/1982 | Nagai | 56/11.3 |
| 4,352,266 | 10/1982 | Lloyd et al. | 56/11.3 |
| 4,372,433 | 2/1983 | Mitchell et al. | 192/18 R |
| 4,377,224 | 3/1983 | Takata et al. | 192/18 R |
| 4,524,853 | 6/1985 | Nagai | 192/18 R |
| 4,538,712 | 9/1985 | Nagai | 192/18 R |

Primary Examiner—Richard Lorence
Attorney, Agent, or Firm—Leydig, Voit & Mayer

[57] ABSTRACT

A clutch/brake unit especially adapted for use with a walk-behind lawn mower and having a braking element which applies a brake and disengages a clutch when shifted axially in response to turning of a rotary actuator in one direction. A single anti-rotation bolt extends between the braking element and the engine of the mower to prevent rotation of the braking element when the brake is applied. Angularly spaced springs urge the braking element axially toward the rotary actuator and are located above the actuator so as to be shielded from lawn trash.

6 Claims, 2 Drawing Sheets

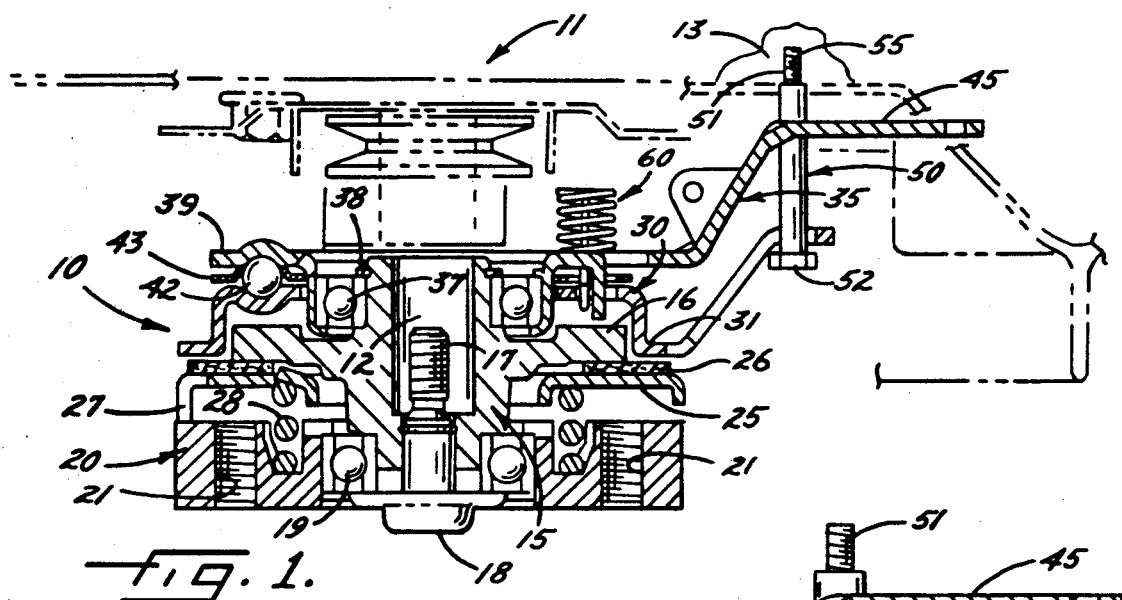

５,０３３,５９５

CLUTCH/BRAKE UNIT

BACKGROUND OF THE INVENTION

This invention relates generally to a clutch/brake unit and, more particularly, to a clutch/brake unit for use with a machine such as a walk-behind lawn mower. In a clutch/brake unit of this type, the clutch normally is disengaged to uncouple the cutting blade from the drive shaft of the engine and, in addition, the brake normally is engaged to prevent rotation of the blade. When a manual control such as a deadman lever is actuated, the clutch is engaged and the brake is released so as to permit driving of the blade.

A clutch/brake unit of the same general type as the unit of the present invention is disclosed in Takata et al U.S. Pat. No. 4,377,224. In the clutch/brake unit of the Takata et al patent, an input hub rotates with the drive shaft of the engine of the mower while an output hub is supported to rotate relative to the shaft. A friction plate is coupled to rotate with and move axially relative to the output hub and is spring-biased into engagement with the input hub. When the clutch is engaged, the input hub rotates the output hub by way of the friction plate.

The Takata et al unit also includes a braking element which is supported to move axially relative to the input member. When the deadman control is manually released, a rotary actuator is turned in one direction and acts through a series of angularly spaced balls to cam the braking element axially into engagement with the friction plate. This applies a braking force to the output hub and, at the same time, forces the friction plate out of engagement with the input hub so as to interrupt the drive from the input hub to the output hub. When the deadman lever is manually actuated, the rotary actuator is turned in the opposite direction, the braking member releases the friction plate, and the friction plate transmits torque from the input hub to the output hub.

In order for a clutch/brake unit of the foregoing type to function properly, it is necessary that the braking element be held against rotation. Also, it is necessary that the braking element be biased toward the rotary actuator so that, when the brake is released, the braking element will act to reset the balls into proper angular positions for the next brake-engagement/clutch-disengagement step. In the clutch/brake unit of the Takata et al patent, rotation of the braking element is prevented by a plurality of angularly spaced bolts which extend through the braking element and which are threaded into the lower end of the engine. Coil springs are telescoped over the anti-rotation bolts and are compressed against the braking element in order to bias the latter toward the rotary actuator.

SUMMARY OF THE INVENTION

The general aim of the present invention is to provide a new and improved clutch/brake unit of the foregoing type in which the need for multiple angularly spaced anti-rotation bolts is avoided while still enabling angularly balanced spring forces to be applied to the braking element.

A more detailed object of the invention is to achieve the foregoing by providing a clutch/brake unit having a single anti-rotation connection for preventing rotation of the braking element and having a plurality of angularly spaced and uniquely arranged springs divorced from the anti-rotation connection and capable of applying angularly balanced forces to the braking element.

The invention also resides in the novel location of the springs to reduce the danger of lawn trash accumulating on the springs.

These and other objects and advantages of the invention will become more apparent from the following detailed description when taken in conjunction with the accompanying drawings.

BRIEF DESCRIPTION OF THE DRAWINGS

FIG. 1 is an axial cross-sectional view of a new and improved clutch/brake unit incorporating the unique features of the present invention and shows the unit installed on the drive shaft of a typical lawn mower engine.

FIG. 2 is an enlarged axial cross-sectional view of certain components of the clutch/brake unit shown in FIG. 1.

FIG. 3 is a reduced top plan view of the components shown in FIG. 2.

DETAILED DESCRIPTION OF THE PREFERRED EMBODIMENT

Figure 4:
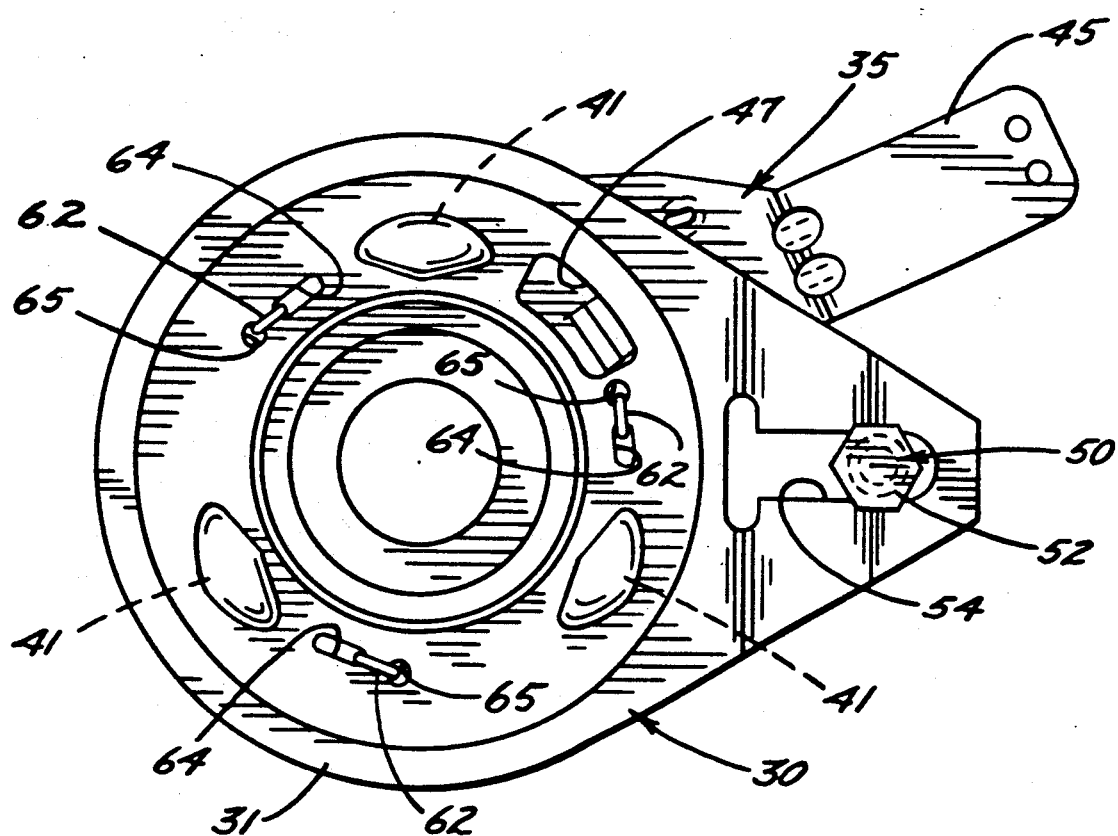
FIG. 4 is a reduced bottom plan view of the components shown in FIG. 2.

For purposes of illustration, the invention has been shown in the drawings as embodied in a clutch/brake unit 10. While the unit has many applications, it is especially adapted for use in conjunction with the engine 11 of a lawn mower. The engine includes a downwardly projecting drive shaft 12 supported for rotation by a base member or engine block 13. A cutting blade (not shown) is adapted to be rotated by the shaft.

In general, the clutch/brake unit 10 includes an input member or hub 15 formed with a radially projecting flange 16. The input hub 15 is keyed to the drive shaft 12 of the engine 11 and is held thereon by a screw 17 having an enlarged head 18. The screw 17 extends through the input hub 15 and is threaded into the shaft 12 while the head 18 engages the lower end of a bearing 19 and causes the bearing to clamp the input hub against the lower end of the shaft.

Journaled for rotation on the bearing 19 is an output member or hub 20 which is formed with angularly spaced holes 21. Fasteners (not shown) are threaded into the holes 21 to connect the mower blade to the output hub 20.

Located between the output hub 20 and the flange 16 of the input hub 15 is a friction plate 25 having a ring 26 of friction material secured to its upper side. The friction plate 25 is coupled to rotate with and move axially relative to the output hub 20 by means of angularly spaced fingers 27 (only one finger being visible) formed integrally with and depending from the friction plate and fitting slidably into slots formed in the outer periphery of the output hub. The fingers act as keys to rotationally couple the friction plate 25 to the output hub 20 while permitting the friction plate to move axially with respect to the output hub.

A coil spring 28 is compressed between the output hub 20 and the friction plate 25 and urges the latter upwardly to press the friction material 26 against the flange 16 of the input hub 15. When the friction material is in engagement with the flange, the friction plate 25 couples the input hub 15 to the output hub 20 to effect rotation of the mower blade.

Located above the input hub 15 is a braking element 30 formed with an annular flange 31 which is adapted to engage the friction material 26 on the friction plate 25. The braking element 30 is supported to shift downwardly from the position shown in FIG. 1 and, when the braking element is shifted downwardly, the flange 31 pushes the friction plate 25 downwardly to release the friction material 26 from the flange 16 of the input hub 15 and thereby interrupt the drive between the input hub and the output hub 20. At the same time, the flange 31 acts against the friction material 26 to retard rotation of the friction plate 25 and the output hub 20 and thereby brake the mower blade to a stop. When the braking element 30 is shifted upwardly, the braking pressure against the friction material is released and, in addition, the spring 28 acts to push the friction plate 25 upwardly so as to press the friction material against the flange 16 of the input hub 15 and thereby engage the drive.

Upward and downward shifting of the braking element 30 is effected in response to turning of a rotary actuator 35. Herein, the actuator includes a cup-shaped central portion 36 (FIG. 2) which receives a bearing 37 that, in turn, is supported on the input hub 15 and is retained axially thereon by a snap ring 38 (FIG. 1). The bearing 37 thus supports the actuator 35 for rotary movement relative to the input hub 15.

An outwardly radially projecting flange 39 (FIG. 2) is integral with the upper end of the cup-shaped portion 36 of the actuator 35 and its lower side is formed with a plurality (e.g., three) angularly spaced grooves 40 (FIGS. 2 and 3) which are alined generally circumferentially with a like number of grooves 41 (FIGS. 2 and 4) in the upper side of the braking element 30. A spherical ball 42 is located in each pair of alined grooves 40, 41 and is sandwiched between the braking element 30 and the rotary actuator 35. A thin cage 43 also is located between the braking element and the actuator and receives all three balls to maintain a fixed angular spacing between the balls.

The coacting grooves 40 and 41 are ramped in such a manner that, when the actuator 35 is turned in one direction, the balls 42 cam against the braking element 30 and force the latter downwardly to disengage the clutch 16, 26 and apply the brake 26, 31. When the actuator is turned in the opposite direction, the braking element is permitted to shift upwardly to engage the clutch and release the brake.

In a typical lawn mower, turning of the actuator 35 is effected in response to movement of a deadman lever (not shown) located adjacent the handle of the mower. The actuator is formed with an elongated arm 45 which is operably connected to the deadman lever. If the deadman lever is released, a torsion spring (not shown) turns the actuator 35 in a direction to disengage the clutch 16, 26 and apply the brake 26, 31. When the deadman lever is manually actuated and held, the actuator is turned in a direction to engage the clutch and release the brake. A finger 46 (FIG. 2) is struck downwardly from the actuator 35 and fits into an arcuate window 47 in the braking element 30 to restrict rotation of the actuator to a limited range.

Figure 5:
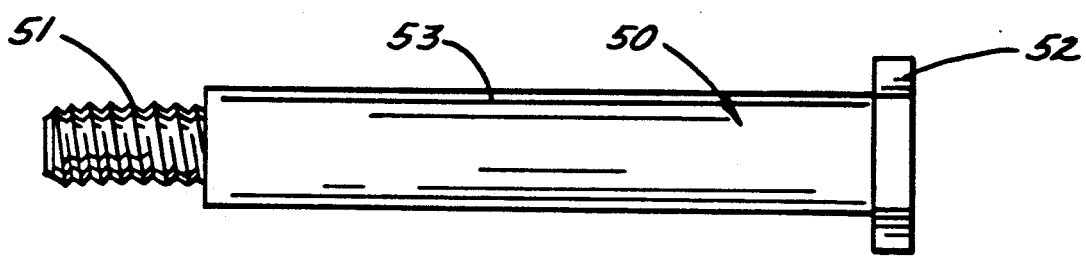
FIG. 5 is an elevational view of the anti-rotation bolt for the braking element of the clutch/brake unit.

In order for the braking element 30 to apply a braking force to the friction plate 25, it is necessary that the braking element be held against rotation. According to the present invention, this is achieved through the provision of a single anti-rotation connection 50 between the engine block 13 and the braking element 30. Herein, the anti-rotation connection 50 is in the form of a single bolt having a relatively short threaded shank 51 (FIG. 5) at one end, an enlarged hexagonal driving head 52 at its opposite end, and a smooth and relatively long shoulder portion 53 between the shank and the head. The bolt 50 is installed simply by inserting the shoulder portion 53 through a slot 54 (FIGS. 3 and 4) in the braking element 30 and threading the shank 51 into a tapped hole 55 (FIG. 1) in the engine block 13. Since only one bolt 50 is utilized to prevent rotation of the braking ring 30, the lawn mower manufacturer is saved the expense of providing and installing multiple anti-rotation bolts and is saved the cost of drilling and tapping multiple holes 55 in the engine block 13.

The present clutch/brake unit 10 also is characterized by the fact that springs 60 (FIGS. 2 and 3) for urging the braking element 30 upwardly toward the actuator 35 are divorced from the anti-rotation bolt 50 and preferably are positioned so as to reduce the risk of lawn trash accumulating on the springs. In this instance, three coiled compression springs are spaced equally around the upper side of the actuator 35 between the grooves 40 thereof. An elongated tang 61 is joined integrally to the upper turn of each spring, extends downwardly through the body of the spring and terminates in an upwardly curved hook 62. The body of each spring seats on the upper side of the actuator flange 39 while the tang of the spring threads downwardly through an elongated slot 63 (FIG. 3) in the flange and through a generally circumferentially alined elongated slot 64 (FIG. 4) formed in the braking element 30, there also being a tang-accommodating opening in the cage 43. The hook 62 on the lower end of each tang 61 catches in a hole 65 formed in the braking element 30 adjacent the slot 64 to anchor the spring and to preload the spring in a state of compression.

When the braking element 30 is shifted downwardly by rotation of the actuator 35 and the camming action of the balls 42, the springs 60 are compressed even further. Thus, when the actuator 35 is subsequently turned in the opposite direction, the springs 60 draw the braking element 30 upwardly toward the actuator to release the pressure on the friction ring 26. The positive upward movement of the braking element causes the grooves 41 to force the balls 42 in a direction opposite to the direction the balls moved during camming of the braking element and thus the balls are reset to proper angular positions in the grooves 40 and 41 to again cam the braking element downwardly upon initiation of the next braking sequence.

Even though the clutch/brake unit 10 includes only a single anti-rotation bolt 50, the three springs 60 exert angularly balanced forces on the braking element 30. Being located above the actuator 35, the springs are shielded from lawn trash and the like and are not likely to become fouled.

I claim:

1. A clutch/brake unit for a machine having a base member and having a rotary drive shaft projecting from the base member, said unit comprising an input member connected to rotate with said shaft, an output member supported to rotate relative to said shaft, a friction plate coupled to rotate with and move axially relative to said output member, means urging said friction plate axially into frictional engagement with said input member so as to cause said input member to rotate said output member by way of said friction plate, a braking element supported to move axially relative to said input member while permitting rotation of said input member relative to said braking element, a rotary actuator, a plurality of angularly spaced ramped grooves in said actuator and said braking element, balls disposed between said actuator and said braking element and located in said grooves, said balls coacting with said grooves in response to rotation of said actuator in one direction to cam said braking element axially into engagement with said friction plate and cause said braking element to force said friction plate axially out of engagement with said input member, said clutch/brake unit being characterized by the provision of a single anti-rotation connection between said braking element and said base member for restricting rotation of said braking element, and a plurality of angularly spaced springs connected between said braking element and said actuator at locations remote from said anti-rotation connection and acting to bias said braking element axially toward said actuator and axially away from said friction plate and thereby cause said balls to shift angularly in said grooves when said actuator is rotated in a direction opposite to said one direction.

2. A clutch/brake unit as defined in claim 1 in which said anti-rotation connection comprises a single bolt extending through an opening in said braking element and threaded into said base member.

3. A clutch/brake unit as defined in claim 1 in which each of said springs includes a coil supported on said actuator and having a tang connected to said braking element, each of said coils being compressed when said braking element is cammed axially into engagement with said friction plate.

4. A clutch/brake unit as defined in claim 3 further including angularly spaced sets of generally axially alined openings in said braking element and said actuator and accommodating the tangs of said springs.

5. A clutch-brake unit as defined in claim 4 in which said actuator is located above said braking element, the coils of said springs being located above said actuator.

6. A clutch/brake unit for a machine having a base member and having a rotary drive shaft projecting from the base member, said unit comprising an input member connected to rotate with said shaft, an output member supported to rotate relative to said shaft, a friction plate coupled to rotate with and move axially relative to said output member, means urging said friction plate axially into frictional engagement with said input member so as to cause said input member to rotate said output member by way of said friction plate, a braking element supported to move axially relative to said input member while permitting rotation of said input member relative to said braking element, a rotary actuator, a plurality of angularly spaced ramped grooves in said actuator and said braking element, balls disposed between said actuator and said braking element and located in said grooves, said balls coacting with said grooves in response to rotation of said actuator in one direction to cam said braking element axially into engagement with said friction plate and cause said braking element to force said friction plate axially out of engagement with said input member, said clutch/brake unit being characterized by the provision of a single anti-rotation connection between said braking element and said base member for restricting rotation of said braking element, and spring means connected between said braking element and said actuator and acting on at least one of said braking element and said actuator at a plurality of angularly spaced locations remote from said anti-rotation connection and acting to bias said braking element axially toward said actuator and axially away from said friction plate and thereby cause said balls to shift angularly in said grooves when said actuator is rotated in a direction opposite to said one direction.

* * * * *